United States Patent Office 3,227,706
Patented Jan. 4, 1966

3,227,706
PREPARATION OF AZODICARBONAMIDE
Ignaz Binzer, New York, N.Y., assignor to Fairmount
Chemical Co., Inc., Newark, N.J.
No Drawing. Filed May 17, 1965, Ser. No. 456,470
4 Claims. (Cl. 260—192)

This invention relates to a new method of preparing a blowing agent and, more particularly, to the method of preparing the nitrogen-releasing blowing agent azodicarbonamide. It is more specifically directed to the process of producing azodicarbonamide by oxidizing hydrazodicarbonamide with an alkali metal chlorate, particularly sodium chlorate.

This application is a continuation-in-part application of Serial No. 228,755, filed October 5, 1962, now abandoned.

Blowing agents are chemical compounds which under certain conditions evolve into a gaseous phase. This property of blowing agents is utilized in the manufacture of various foams and sponges which are characterized by their extensive cellular structure and low ratio of weight to volume. Foam materials, especially plastic foams, have wide application, including such familiar uses as thermal insulation, life jackets, seat cushions, and package fillers.

Azodicarbonamide is a well known blowing agent. It is an organic compound which at between about 160°–200° C. evolves into a gas, the principal constituent of which is nitrogen. Azodicarbonamide is known under several trade names, including, for example "Kempore," "Celogen AZ," and "Porofor 505–A."

As far as it is known, there is only one general method of preparing azodicarbonamide. That method, as disclosed in B.I.O.S. Final Report No. 1150, page 23, and Hill patent No. 2,988,545, is to oxidize a hydrazoamide with an alkali metal chromate; specifically, sodium dichromate. Referring to the Hill patent, hydrazodicarbonamide is reacted with sodium dichromate. During each of two separate phases of the reaction, temperature is maintained at different levels.

A typical reaction wherein sodium dichromate is used as the oxidizing agent is shown by the following equation:

3NH₂CO—NH—NH—CONH₂
3NH₂CO—N=N—CONH₂+Na₂SO₄+Cr₂(SO₄)₃+9H₂O

In a reaction as just shown above, there are several disadvantages. Sodium dichromate has a high molecular weight and requires the use of large amounts of the compound to accomplish the oxidation. The rate of reaction is relatively slow, taking several hours to produce a batch of azodicarbonamide. Further, the deep green color of the chromate ions masks the orange colored azo compound to such an extent that it is difficult to determine the end point of the reaction. In addition to the fact that chromium compounds are skin irritants, there are presented serious and expensive waste disposal problems. The present invention overcomes these problems.

The present invention is based upon the discovery that it is possible to oxidize hydrazodicarbonamide with an alkali metal chlorate, such as sodium chlorate, to produce exceptionally high yields of high-quality azodicarbonamide. By using sodium chlorate as the oxidizing agent, it is possible to obtain higher yields and a more rapid (yet controllable) reaction rate than is possible by using sodium dichromate. Moreover, the use of sodium chlorate (and any alkali metal chlorate) as the oxidant permits the course of the reaction to be easily followed via the characteristic color change without any obscuration by any side products.

Based upon this discovery, the present invention provides an improved process for producing azodicarbonamide which comprises oxidizing hydrazodicarbonamide with at least a stoichiometric amount of alkali metal chlorate and recovering azodicarbonamide from the resultant reaction mixture. The method of the invention is carried out in the presence of a catalytic amount of a vanadium compound wherein the vanadium can be a cation or a part of a cation such as different forms of vanadium oxides, i.e., VO, V₂O₃, V₂O₅, VO²⁺, VO³⁺, or part of an anion as exemplified by the numerous forms of vanadic acid. The vanadium catalyst is preferably introduced into the solution in the form of a vanadium containing salt such as ammonium metavanadate. The basic reaction is shown as follows:

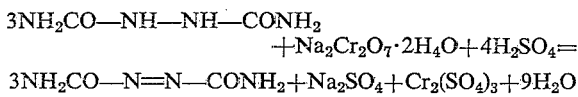

The following examples are illustrative of the ease with which hydrazodicarbonamide may be oxidized to azodicarbonamide in accordance with the invention:

*Example I*

To a solution of 50 ml. of water, 5 ml. of concentrated sulfuric acid, and 0.3 gram of ammonium metavanadate was added 10 grams of hydrazodicarbonamide. The resultant suspension was heated to 70° C. and 3.3 grams of sodium chlorate was added over the period of about 10 minutes while the temperature was held at between 70° C. to 85° C. The suspension was then cooled to 10° C. and filtered, yielding 8.5 grams of azodicarbonamide which was then dried at 50° C. The yield was 87% of theory.

*Example II*

To a solution of 50 ml. of water, 0.7 ml. of concentrated sulfuric acid and 0.3 gram ammonium metavanadate, was added 10 grams of hydrazodicarbonamide. The suspension was heated to 70° C. and 3.3 grams of sodium chlorate was added over a period of about 10 minutes during which the temperature was held at between 70° C. to 85° C. The suspension was then cooled to 10° C. and filtered. The yield of 8.8 grams, which was then dried at 50° C., contained about 1% to 5% hydrazodicarbonamide, the remainder being azodicarbonamide.

Although the reaction temperature was held to between 70° C. to 85° C. in the examples, the operable temperature range is considered to be between 60° C. to 105° C.

Sodium chlorate is a strong oxidizing agent which must be carefully handled. In view of its strong oxidizing capabilities, it might have been expected that if it reacted with hydrazodicarbonamide it would over-react causing complete decomposition of that compound. However, contrary to exceptation, only the hydrogens of the hydrazo group were selectively oxidized while the hydrogens of the terminal amino groups, as well as the rest of the molecule, remained intact.

The kinetics of the sodium chlorate oxidation of hydrazodicarbonamide are surprisingly rapid yet readily controllable. Where sodium dichromate is used as the oxidizing agent, the typical reaction period is in the order of one and one half to two hours; the reaction period when using an equivalent amount of sodium chlorate, as shown by the foregoing examples, is in the order of five to fifteen minutes. Because of the unexpectedly rapid reaction, azodicarbonamide may be produced on a continuous rather than a batch basis. This rapid reaction results in no sacrifice of quality of the end product and produces yields in the order of about 87% of theory or even higher.

Because of the clarity of the sodium chlorate reaction, the reaction can be easily followed. The presence of the azodicarbonamide is immediately apparent from the orange color of the suspension, there being no side products to mask the reaction. In addition, oxidation of hydrazodicarbonamide with sodium chlorate leaves a non-toxic residue in the form of sodium chloride, the disposal of which is considerably easier and more economical than any disposal problems involved with the dark sludge of the chromic sulfate residue.

Although the foregoing examples have shown the ease with which hydrazodicarbonamide may be oxidized to azodicarbonamide with sodium chlorate, equally satisfactory results may be obtained by using any alkali metal chlorate as the oxidizing agent.

I claim:

1. The process of producing azodicarbonamide which comprises oxidizing hydrazodicarbonamide with at least a stoichiometric amount of alkali metal chlorate in the presence of a catalytic amount of a vanadium compound selected from the group consisting of vanadium oxides and vanadic acids while maintaining the reaction temperature in the range between about 60° C. and about 105° C., and recovering azodicarbonamide from the resultant reaction mixture.

2. The process of producing azodicarbonamide which comprises oxidizing hydrazodicarbonamide with at least a stoichiometric amount of alkali metal chlorate in the presence of a catalytic amount of ammonium metavanadate while maintaining the reaction temperature in the range between about 60° C. and about 105° C. and recovering azodicarbonamide from the resultant reaction mixture.

3. The process of producing azodicarbonamide which comprises oxidizing hydrazodicarbonamide with at least a stoichiometric amount of sodium chlorate in the presence of a catalytic amount of ammonium metavanadate while maintaining the reaction temperature in the range between about 60° C. and about 105° C., and recovering azodicarbonamide from the resultant reaction mixture.

4. The process of producing azodicarbonamide which comprises oxidizing hydrazodicarbonamide with at least a stoichiometric amount of sodium chlorate in the presence of a catalytic amount of ammonium metavanadate while maintaining the reaction temperatures in the range between about 70° C. and 85° C., cooling the resultant reaction mixture to a temperature of about 10° C., and recovering the azodicarbonamide from the cooled reaction mixture.

References Cited by the Examiner

UNITED STATES PATENTS

| | | | |
|---|---|---|---|
| 2,444,924 | 7/1948 | Farkas et al. | 260—596 |
| 2,988,545 | 6/1961 | Hill | 260—192 |

OTHER REFERENCES

Remy, H.: Treatise on Inorganic Chemistry, vol. II (1956), pages 92, 98, 99.

CHARLES B. PARKER, *Primary Examiner.*

JOSEPH P. BRUST, *Examiner.*

DONALD M. PAPUGA, *Assistant Examiner.*